Patented Oct. 30, 1934

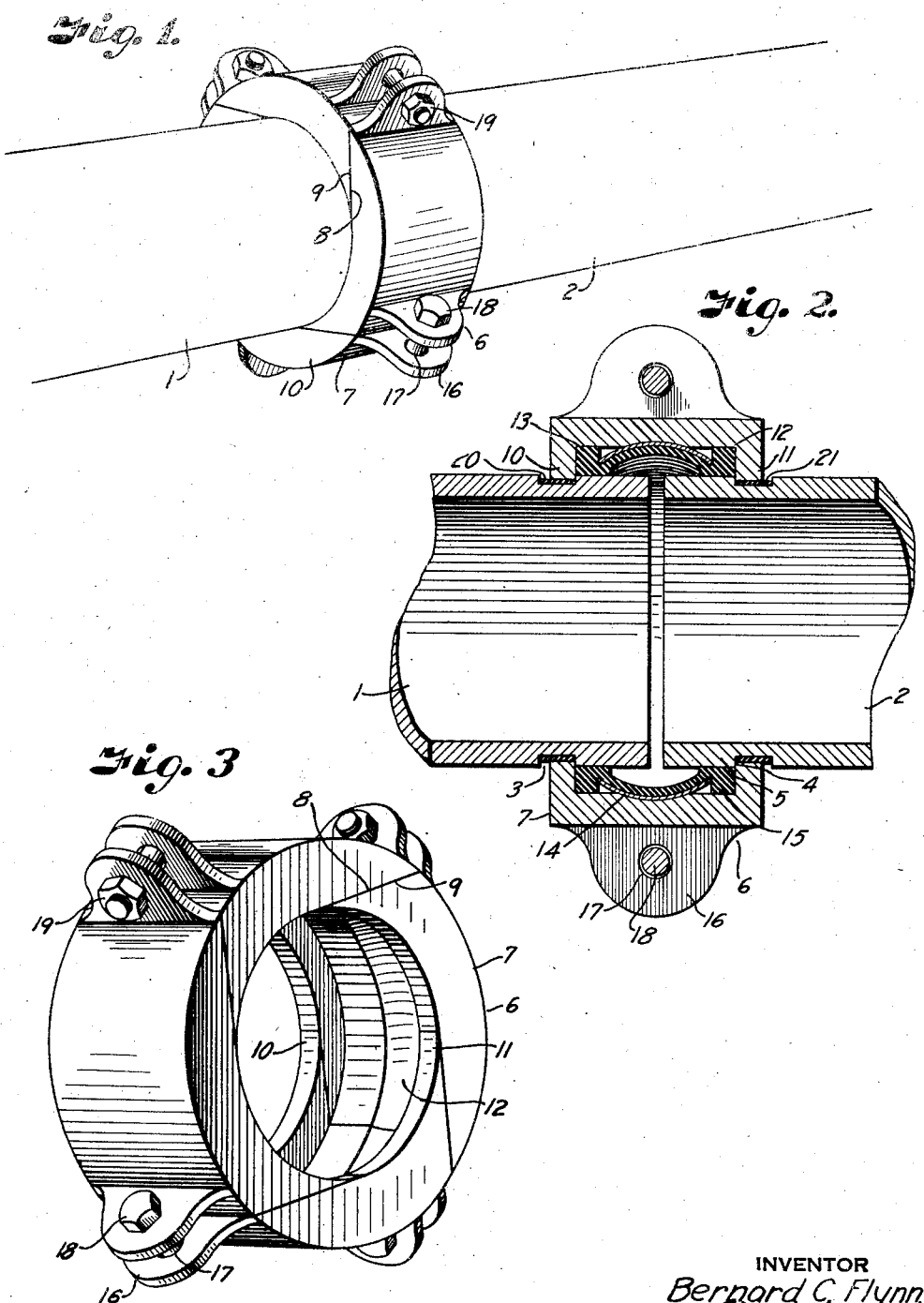

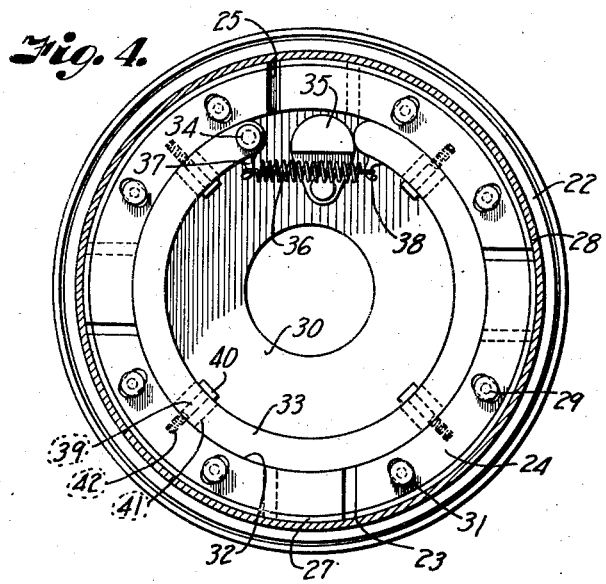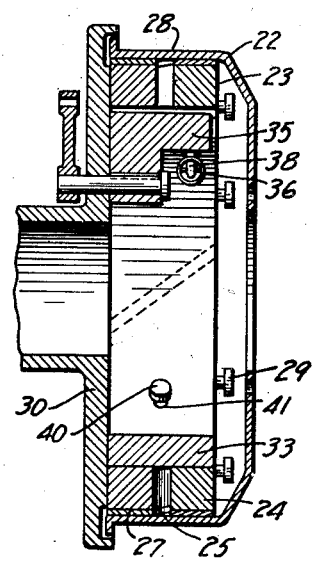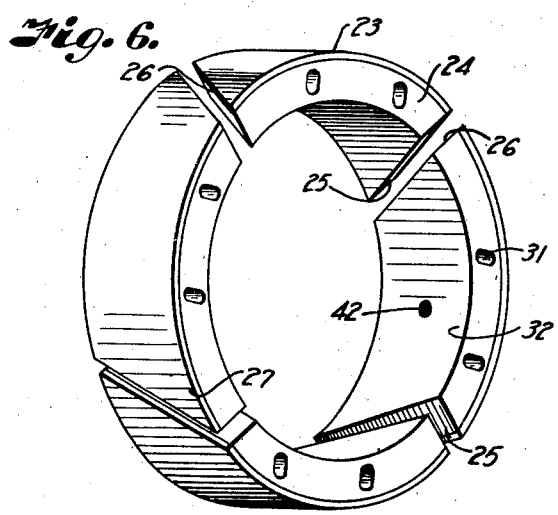

1,978,453

UNITED STATES PATENT OFFICE 1,978,453

VARIABLE DIAMETER GRIPPING DEVICE

Bernard C. Flynn, Tulsa, Okla.

Application June 5, 1933, Serial No. 674,304

5 Claims. (Cl. 285—194)

My invention relates to a variable diameter gripping device and has for its principal object to provide a device of this character for exerting circumferential pressures against cylindrical surfaces.

In accomplishing these and other objects of my invention, I have provided improved details of structure, the preferred forms of which are illustrated in the accompanying drawings, wherein:

Fig. 1 is a perspective view of a pair of abutting pipe sections connected with a variable diameter gripping member embodying my invention.

Fig. 2 is a central section of adjacent ends of the abutting pipe sections with the gripping member and sealing means in position for securing the sections together.

Fig. 3 is a detail perspective view of the gripping member.

Fig. 4 is a sectional view through a brake mechanism equipped with an externally expanding gripping member embodying the principles of my invention.

Fig. 5 is a vertical section through the brake, and

Fig. 6 is a detail perspective view of the gripping member employed in the brake.

Referring more in detail to the drawings:

1 and 2 represent the ends of adjacent pipe sections having grooves 3 spaced from the ends thereof to form shoulders 4 and collar portions 5. The collar portions 5 are engaged by a variable diameter gripping device 6 constructed in accordance with my invention and which serves as a coupling, whereby the ends of the sections are drawn into alignment to form a continuous conduit.

The gripping device 6 is made up of a plurality of arcuate segments 7 having overlapping inclined ends 8 and 9 arranged about the pipe sections so that the ends 8 of one segment slidingly overlap the ends 9 of the next segment to form a complete circle, the diameter of which depends upon the degree of overlap of the segments.

When the gripping device 6 serves as a coupling, it is equipped with spaced internal flanges 10 and 11 for seating in the grooves 3 and for engaging the collar portions of adjacent pipe sections.

In the gripping device illustrated, the ends are bevelled or cut in the same directions on planes substantially tangential to the circumference of the pipe sections.

It should be noted that the internal flanges 10 and 11 are of less width than the grooves 3 to permit limited longitudinal movement of the sections relative to each other, thus allowing for expansion and contraction of the pipe caused by temperature changes. The height of the flanges is also greater than the depth of the grooves to provide a recess 12 in the coupling encompassing the joint between the pipe sections for retaining a sealing ring 13.

The sealing ring 13 is preferably formed of resilient material, such as is used in common practice for packing purposes, and is backed by a spring like metallic ring 14 having its side edges bearing against flanges 15 on the sealing ring to urge them into sealing engagement with the flanges 10 and 11.

Projecting radially from the segments near their tapered ends are transverse lugs or ears 16 provided with openings 17 for loosely receiving bolts 18 or the like for clamping the segments together by means of nuts 19 threaded on the bolts.

The procedure of connecting adjacent ends of pipe sections with a gripping device constructed as described is as follows:

A sealing ring 13 backed by a pressure ring 14 is mounted over adjacent ends of the pipe sections and sealing rings 20 and 21 are placed in the grooves 4. A pair of loosely assembled segments are then seated over the sealing rings with the flanges of the segments resting in the grooves of the pipe sections. Another pair of loosely connected segments may then be mounted in like manner over the remaining exposed portion of the rings, whereupon bolts are extended through adjacent ears on the respective pairs of segments and all the bolts are uniformly tightened to clamp the segments uniformly about the sealing rings.

During tightening of the bolts, the ends of the overlapping segments slide on each other to allow for contraction of the ring.

It will be obvious that the order of assembly may be varied if desired and that a coupling may be composed of any number of segments required for most effectively securing the ends of pipe sections together in sealed relation.

The sealing ring should be of such thickness that the flanges of the coupling will ordinarily not engage the base of the grooves so that if leakage should occur the abutting ends of the coupling sections may be moved slightly over each other by further tightening of the bolts for more firmly engaging the sealing ring with the pipe sections.

In Figs. 4, 5 and 6 is shown an adaptation of the gripping ring, wherein it is expanded to effect gripping action against a brake drum 22. In this instance the gripping ring 23 includes a plurality of segments 24 having inclined ends 25 and 26 formed on planes extending transversely of the axis of the ring as shown in Fig. 6. The segments 24 may be provided on their gripping faces with a friction lining 27, as in customary practice.

In order to support the segments in position to be moved into gripping relation with the flange 28 of the brake drum, they are loosely mounted on headed pins 29 projecting from the inner face of a fixed plate 30 which cooperates with the drum in enclosing the gripping elements as in ordinary brake construction, the pins extending through radial slots 31 in the segments.

Mounted within and engaging the inner arcuate faces 32 of the segments is a split expanding ring 33, one end of the ring being anchored to the plate 30 by a bolt 34 and its opposite end is engaged by a cam 35.

The free end of the expanding ring is normally retracted against the cam by a coil spring 36 having its ends secured to hooks 37 and 38 on the adjacent ends of the ring.

To prevent the segments from dragging upon the brake drum when the brake is released, the segments are preferably secured to the expanding ring so that they follow the expansive and contractive movement thereof.

To secure the segments, bolts 39 having heads 40 are extended through slotted openings 41 in the expanding ring and are threaded into sockets 42 in the segments so that the heads 40 engage the inner face of the ring.

It is thus apparent that the segments cannot move radially independently of the expanding ring, but the slots allow for free lateral and arcuate movement thereof to permit the segments to wedge against the drum.

The slots 41 and the bolts 39 are of sufficient length to allow lateral movement of the segments so that the end of one segment will slide upon the inclined end of the other to increase the effective expansion and wedging action of the gripping device.

From the foregoing it is apparent that gripping segments embodying the principles of my invention are adaptable to internal, as well as external, gripping devices, and they are adaptable to various type devices for gripping cylindrical surfaces.

What I claim and desire to secure by Letters Patent is:

1. In combination with a pair of pipe sections having annular shoulders adjacent their ends, a packing ring encircling the ends of the pipe sections, a coupling comprising a ring encircling the packing ring having internal flanges for engaging said shoulders and split tangentially of the inner diameter of the clamping ring to form segments arranged so that the end of one section slides in contact with the end of the adjacent section during adjustment of the coupling to prevent pinching of the packing ring therebetween, and means for clamping the segments together for contracting the ring about the pipe sections.

2. In combination with a pair of abutting pipe sections having annular shoulders adjacent their ends, a coupling comprising a split ring forming a plurality of segments and internal flanges for engaging said shoulders and forming an annular recess therebetween, a packing ring seated in said recess and engaging over the joint between said sections, a spring ring encircling the packing ring and having side edges engaging the packing ring to urge the packing ring into engagement with said flanges, and means for clamping the segments together for contracting the packing and spring rings about the pipe sections.

3. In combination with a pair of pipe sections having annular grooves adjacent their ends, a coupling comprising a ring split on tangential lines to form segments having internal flanges for seating in said grooves and forming an annular recess, a packing ring seated in said recess, a spring ring having arch shaped cross section engaged in said segments and encircling the packing ring and means for clamping the segments together for contracting the spring ring and compressing the packing ring.

4. In combination with a pair of abutting pipe sections having annular shoulders adjacent their ends, a plurality of arcuate segments having overlapping ends formed substantially tangential to the circumference of said pipe sections and having inwardly extending flanges arranged to engage said shoulders, a packing element extending over the ends of said pipe sections and engaged by said segments, a spring ring engaged by the segments and having side edges engaging the packing element to force the packing element into sealing contact with said flanges and means for drawing the segments together in sliding contact with each other to contract the spring ring and to compress the packing element.

5. In combination with a pair of pipe sections, a coupling for the pipe sections comprising a ring having internal flanges engaging the pipe sections and split tangentially of the inner periphery of the ring at a plurality of points about the ring to form a plurality of segments, pairs of ears on the segments, draw bolts extending through the ears, and a packing element inserted between said flanges for sealing the joint between the pipe sections.

BERNARD C. FLYNN.